United States Patent [19]

Yoshimi et al.

[11] 4,386,279

[45] May 31, 1983

[54] SWITCH APPARATUS FOR VEHICLE

[75] Inventors: Tomohisa Yoshimi, Gamagori; Akira Kuno, Oobu; Yoshio Shinoda, Aichi, all of Japan

[73] Assignee: Nippon Soken, Inc., Nishio, Japan

[21] Appl. No.: 247,550

[22] Filed: Mar. 25, 1981

[30] Foreign Application Priority Data

Apr. 2, 1980 [JP] Japan .................................. 55/43354
May 14, 1980 [JP] Japan ............................ 55/66573[U]
May 22, 1980 [JP] Japan .................................. 55/68250

[51] Int. Cl.$^3$ ........................ H02G 3/00; H01H 25/04
[52] U.S. Cl. ................................ 307/10 R; 200/61.54
[58] Field of Search .......................... 200/61.54, 61.56; 307/1, 10 R

[56] References Cited

U.S. PATENT DOCUMENTS 1,699,392 1/1929 Fisher .......................... 200/61.54 X
3,670,174 6/1972 Sakakibara ......................... 307/10 R
4,227,181 10/1980 Brittain ............................. 307/10 R

FOREIGN PATENT DOCUMENTS 2645395 4/1978 Fed. Rep. of Germany ... 200/61.54

Primary Examiner—Donald A. Griffin
Attorney, Agent, or Firm—Cushman, Darby & Cushman

[57] ABSTRACT

A switch apparatus for use in a vehicle in which the DC signal path electrically connecting between the horn switch disposed on the steering wheel in the steering apparatus and the horn disposed on the vehicle body is utilized to transmit, for example, a constant-speed running control signal from a signal transmitting unit disposed in the steering apparatus to a signal receiving unit disposed in the vehicle body. The signal transmitting unit includes a plurality of switches provided for the purpose of constant-speed running control, and a signal frequency generated in response to manipulation of a selected one of these switches is superposed on the DC signal which is supplied by way of the DC signal path to energize the horn. The DC signal path is also utilized to supply required power to the signal transmitting unit in the steering apparatus.

10 Claims, 3 Drawing Figures

SWITCH APPARATUS FOR VEHICLE

BACKGROUND OF THE INVENTION

This invention relates generally to switch apparatus, and more particularly to a switch apparatus suitable for use in an automotive vehicle to serve various functions including the function of commanding, setting and releasing of a constant-speed running control unit.

In a switch apparatus generally provided in an automotive vehicle, a horn switch only is disposed on an upper part of the steering wheel, while some of the others are mounted on the steering column, and the remaining ones are disposed on the instrument panel. However, it is desirable that such switches as those, which are provided for the purpose of controlling the constant-speed running control unit and which should be manipulated while the vehicle is being driven, be located so as to be readily manipulated by the hand of the driver who grips the steering wheel, and it is also desirable that such switches be located at a position which permits instantaneous identification by the driver.

Due to, however, the fact that the steering wheel is mounted so as to be freely rotatable relative to the body of the vehicle, it is not easy to mount such additional switches on the steering wheel. In the case of the horn switch referred to above, a DC signal path including, for example, a conductor ring and a brush engaging therewith is provided so that the horn switch disposed on the upper part of the steering wheel can be electrically connected to the horn mounted on the vehicle body. However, provision of such a DC signal path for each of the individual switches to be additionally mounted on the steering wheel results inevitably in a complexity of the structure of the switch apparatus and results also in an undesirable reduction of the reliability of the switch apparatus.

A switch apparatus which obviates such disadvantages is disclosed in, for example, Japanese Patent Publication No. 41527/77. According to the proposal of this patent, the switch apparatus includes a single DC signal path and a signal voltage generator capable of generating a plurality of signal voltages different from one another in response to the manipulation of a plurality of switches respectively, so that each of the signal voltages can be transmitted by way of the single DC signal path. The proposed switch apparatus is, however, defective in that a disturbance such as a variation of the output voltage of the battery mounted in the vehicle or a voltage drop occurring at the conductor ring or any other parts tends to give rise to difficulty of accurately identifying the signal voltages corresponding to the individual switches.

SUMMARY OF THE INVENTION

It is a primary object of the present invention to provide a novel and improved switch apparatus for use in an automotive vehicle, which ensures high reliability in spite of a simple structure, and which can simply attain the purpose of signal transmission especially when mounted on the steering wheel.

DESCRIPTION OF THE PREFERRED EMBODIMENTS

Figure 1:
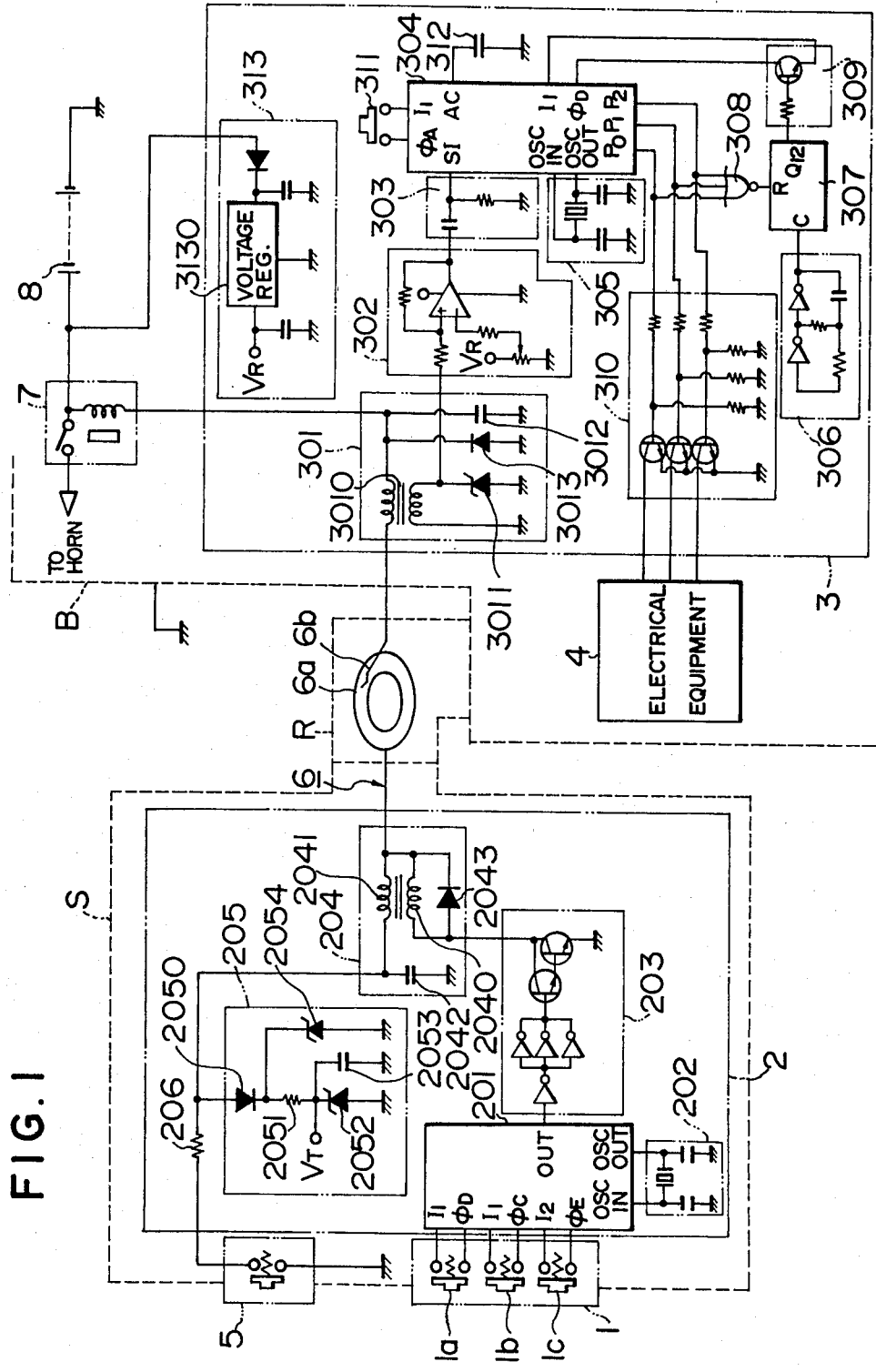
FIGS. 1, 2 and 3 are electrical connection diagrams of a first, second and third embodiments respectively of the present invention.

Preferred embodiments of the present invention will now be described in detail with reference to the accompanying drawings. A first embodiment of the switch apparatus according to the present invention is shown in FIG. 1. Referring to FIG. 1, a steering wheel S extends from the position forward of the compartment of a vehicle toward and into the vehicle compartment and is rotatably supported in the body B of the vehicle by a known rotation transmission mechanism R. An on-off switch 5 including a normally-open or make contact for actuating a horn is mounted, together with a switch assembly 1 including a plurality of electrical switches 1a, 1b and 1c, on the steering wheel S in such a relation that the manipulated parts thereof are exposed in the vehicle compartment and are spaced apart by a distance enough to be individually manipulated by the driver. The horn switch 5 is connected to a horn relay 7 and to a vehicle's battery 8 by means of a DC signal path 6 including conventional electric wirings and the known combination of a conductor ring 6a and a brush 6b. In response to the closure of the horn switch 5, direct current supplied from the vehicle's battery 8 flows through the DC signal path 6 and the horn switch 5 to chassis ground to energize the horn relay 7 thereby activating the horn (not shown).

A signal transmitting unit 2 is disposed in the steering wheel S. This signal transmitting unit 2 is actuated by the power supplied from the battery 8 by way of the DC signal path 6. When a selected one of the electrical switches 1a, 1b and 1c is turned on, the signal transmission unit 2 generates a signal frequency corresponding to the selected switch and transmits the specific signal frequency by way of also the DC signal path 6 to an electrical unit disposed in the vehicle body B. For this purpose, the signal transmission unit 2 includes a signal generating circuit 201 which generates a programmed frequency code signal corresponding to a turned-on or manipulated one of the electrical switches 1a, 1b and 1c. A known signal generator of model M58480 made by the Mitsubishi Electric Company Ltd. in Japan is used as this signal generating circuit 201 in the first embodiment of the present invention. This signal generating circuit 201 includes a key input terminal $I_1$ and a scan output terminal $\phi_D$ connected to the switch 1a, a key input terminal $I_1$ and a scan output terminal $\phi_C$ connected to the switch 1b, and a key input terminal $I_2$ and a scan output terminal $\phi_E$ connected to the switch 1c. Thus, when a selected one of the electrical switches 1a, 1b and 1c is turned on, the corresponding programmed frequency code signal is generated and entrained on a carrier of several-ten kHz to appear three consecutive times at an output terminal OUT of the circuit 201. A ceramic resonator circuit 202 externally provided is connected to the signal generating circuit 201 to apply a reference clock signal to the latter. A signal amplifying circuit 203 including inverters and Darlington-connected transistors amplifies the output signal from the signal generating circuit 201.

A signal superposing circuit 204 includes a transmitter driver coil 2040, a signal transmitter coil 2041, an oscillation capacitor 2042 and a surge absorbing diode 2043. In response to the application of the frequency code signal from the signal generating circuit 201 to the transmitter driver coil 2040 through the amplifying circuit 203, a frequency signal synchronous with the applied frequency code signal is induced in the signal transmitter coil 2041 by the electromagnetic induction. The signal transmitter coil 2041 and the capacitor 2042 constitute an LC resonance circuit whose resonant frequency is determined to be equal to the carrier frequency of the frequency code signal, and the frequency signal generated from this resonance circuit is transmitted to the vehicle body B by way of the DC signal path 6.

A voltage stabilizing circuit 205 includes a diode 2050, a resistor 2051, a Zener diode 2052, a capacitor 2053 and another Zener diode 2054. In the open position of the horn switch 5, charge is stored in the capacitor 2053 through the diode 2050 connected to the load-side terminal of the horn switch 5 and through the resistor 2051, while, at the same time, a regulated voltage $V_T$ is generated from a voltage regulator constituted by the resistor 2051 and the Zener diode 2052 to be supplied to the signal generating circuit 201 and to the signal amplifying circuit 203. Thus, even when the horn switch 5 is turned on temporarily, the charge stored in the capacitor 2053 is discharged to enable the signal transmitting unit 2 to perform its function. The Zener diode 2054 acts to limit the voltage level of the high-voltage pulse signal induced in the signal transmitter coil 2041. A resistor 206 acts as a protective resistor for the horn switch 5.

A signal receiving unit 3 is disposed in the vehicle body B. This signal receiving unit 3 is also actuated by the power supplied from the battery 8. The signal receiving unit 3 picks up only the frequency code signal transmitted from the signal transmitting unit 2 in a relation superposed on the DC signal applied from the horn switch 5 in the steering wheel S to the horn relay 7 by way of the DC signal path 6 and decodes the frequency code signal to generate an electrical signal corresponding to the selected one of the electrical switches 1a, 1b and 1c. This electrical signal is applied to an electrical equipment 4 which is, for example, a constant speed running control unit.

A frequency signal extracting circuit 301 in the signal receiving unit 3 includes a pulse transformer 3010, a Zener diode 3011, a smoothing capacitor 3012 and a surge absorbing diode 3013. In response to the application of the frequency code signal to the primary coil of the pulse transformer 3010, a corresponding frequency signal is induced in the secondary coil to be applied to a known waveform shaping circuit 302 after its peak value is limited by the Zener diode 3011. The smoothing capacitor 3012 absorbs noise generated from, for example, the engine ignition system. After the waveform shaping by the waveform shaping circuit 302, the frequency signal extracted by the frequency signal extracting circuit 301 is applied to a signal decoding circuit 304 through an AC coupling circuit 303.

The signal decoding circuit 304 employed in the first embodiment of the present invention includes a signal decoder of model M58481 made by the Mitsubishi Electric Company Ltd. in Japan. In response to the application of the frequency code signal generated from the signal generating circuit 201 and applied to the signal decoding circuit 304 through the circuits 301, 302 and 303, a programmed decoded signal corresponding to the input signal appears at channel control output terminals $P_0$, $P_1$ and $P_2$ of the signal decoding circuit 304. More precisely, the signal generating circuit 201 and the signal decoding circuit 304 are so programmed that a high level appears only at the output terminal $P_0$ among the output terminals $P_0$, $P_1$ and $P_2$ when the frequency code signal generated from the signal generating circuit 201 in response to the closure of the electrical switch 1a in the switch assembly 1 coincides with one of the frequency codes prepared in the signal decoding circuit 304 and appears three times consecutively at the output terminal OUT of the circuit 201. Similarly, a high level appears only at the output terminal $P_1$ of the signal decoding circuit 304 in response to the closure of the electrical switch 1b, and a high level appears only at the output terminal $P_2$ of the signal decoding circuit 304 in response to the closure of the electrical switch 1c.

A ceramic resonator circuit 305 externally provided is connected to the signal decoding circuit 304 to apply a reference clock signal to the latter. A CR oscillation circuit 306, a binary counter 307 acting as a delay element, a 3-input NOR gate 308 and a transistor switching circuit 309 constitute a reset circuit for resetting the signal decoding circuit 304. When a high level appears at one of the output terminals $P_0$, $P_1$ and $P_2$ of the signal decoding circuit 304, the binary counter 307 is restarted by the output from the 3-input NOR gate 308, and, after several-hundred milliseconds, the transistor switching circuit 309 acts to short-circuit between external control terminals $I_1$ and $\phi_D$ of the signal decoding circuit 304. Consequently, a low level appears at each of the output terminals $P_0$, $P_1$ and $P_2$ of the signal decoding circuit 304.

A transistor switching circuit 310 amplifies the output signal appearing at the output terminals $P_0$, $P_1$ and $P_2$ of the signal decoding circuit 304 to apply the amplified signal to the electrical equipment 4. A switch 311 is connected across terminals $I_1$ and $\phi_A$ of the signal decoding circuit 304 to actuate the signal receiving unit 3. A power-on resetting capacitor 312 is connected across a terminal AC of the signal decoding circuit 304 and the chassis ground. A power supply circuit 313 includes a known voltage regulator circuit block 3130 which is, for example, a 3-terminal regulator of model $\mu A78L05$ made by the Fairchild Corporation in USA. When the electrical equipment 4 includes an on-off switch (which may be the ignition switch or an independent switch) for switching on-off the power supplied from the vehicle's battery 8, such a switch may be arranged to operate in interlocking relation with the receiver actuating switch 311 or with a power on-off switch (not shown) connected between the battery 8 and the signal receiving unit 3.

In operation, in response to the closure of a selected one of the electrical switches 1a, 1b and 1c in the switch assembly 1, a frequency signal of predetermined frequency corresponding to the manipulated switch is transmitted from the signal transmitting unit 2 in the steering wheel S to the signal receiving unit 3 in the vehicle body B by way of the DC signal path 6. In the signal receiving unit 3 disposed in the vehicle body B, the transmitted frequency signal is decoded to generate an electrical signal corresponding to the manipulated one of the switches 1a, 1b and 1c, and such an electrical signal is applied to the electrical equipment 4. Thus, the electrical equipment 4 is controlled by the additional electrical switches disposed on the steering wheel S. Although the frequency signal cannot be transmitted by way of the DC signal path 6 when the horn switch 5 is turned on to energize the horn relay 7 for the purpose of activating the horn, the charge stored in the capacitor 2053 in the voltage stabilizing circuit 205 is discharged as soon as the horn switch 5 is turned off from its turned-on position, so that the signal transmitting unit 2 is immediately enabled to transmit the frequency signal to the signal receiving unit 3.

Figure 2:
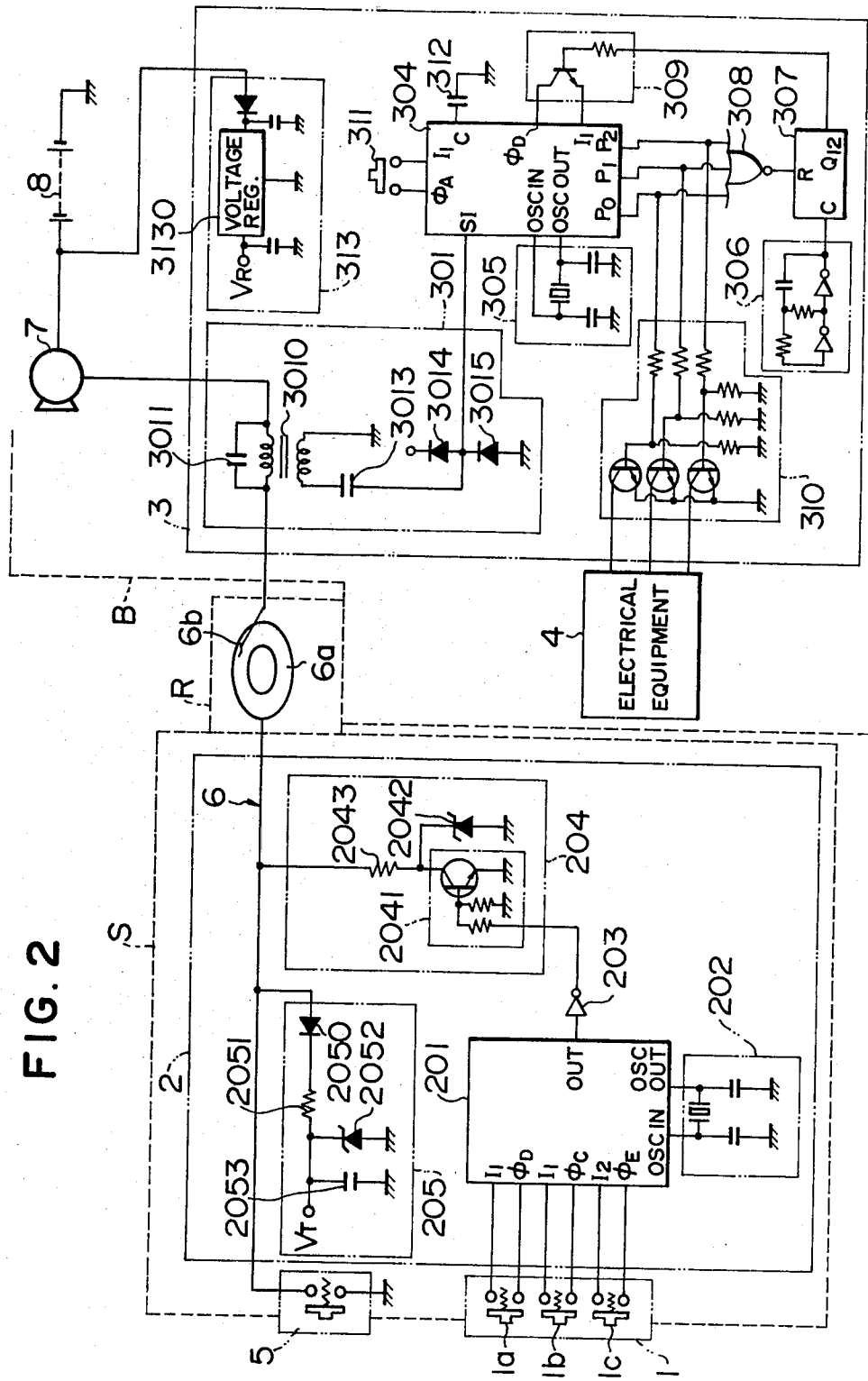

A second embodiment of the present invention is shown in FIG. 2. This second embodiment, which is a modification of the first embodiment, differs basically from the first embodiment in the following points.

Firstly, the signal superposing circuit 204 includes a known current amplifying circuit 2041 composed of resistors and a transistor, a surge absorbing Zener diode 2042 and a current limiting resistor 2043, so that the frequency code signal applied from the signal generating circuit 201 through an inverter 203 is sugjected to current amplification before being transmitted to the signal receiving unit 3 in the vehicle body B by way of the DC signal path 6. Secondly, the frequency code signal applied to the primary coil of the pulse transformer 3010 in the frequency signal extracting circuit 301 in the signal receiving unit 3 is subjected to signal amplification by a parallel LC resonance circuit constituted by the primary coil of the pulse transformer 3010 and a capacitor 3011 connected in parallel with the primary coil before being transmitted to the secondary coil of the pulse transformer 3010. In this latter case, noise components having frequencies different from the carrier frequency of the frequency code signal are substantially removed. The frequency signal induced in the secondary coil of the pulse transformer 3010 is AC-coupled to the signal decoding circuit 304 by a capacitor 3013, and its peak value is limited by diodes 3014 and 3015 before the signal is applied to the signal decoding circuit 304.

In FIG. 2, the same reference numerals and symbols are used to designate the same or equivalent parts and symbols appearing in FIG. 1. The operation of the second embodiment shown in FIG. 2 is similar to that of the first embodiment shown in FIG. 1, and, therefore, any detailed description of its operation will be unnecessary. It will be seen that, in the second embodiment shown in FIG. 2, a semiconductor switching element is connected directly to the DC signal path 6 to act as a means for transmitting the frequency signal from the signal transmitting unit 2 in the steering wheel S to the signal receiving unit 3 in the vehicle body B by way of the DC signal path 6 which is primarily provided for the transmission of the DC signal from the horn switch 5 to the horn relay 7. This eliminates the necessity for provision of a special part such as an electromagnetic coupling. In FIG. 2, reference numeral 7 designates the horn.

Figure 3:
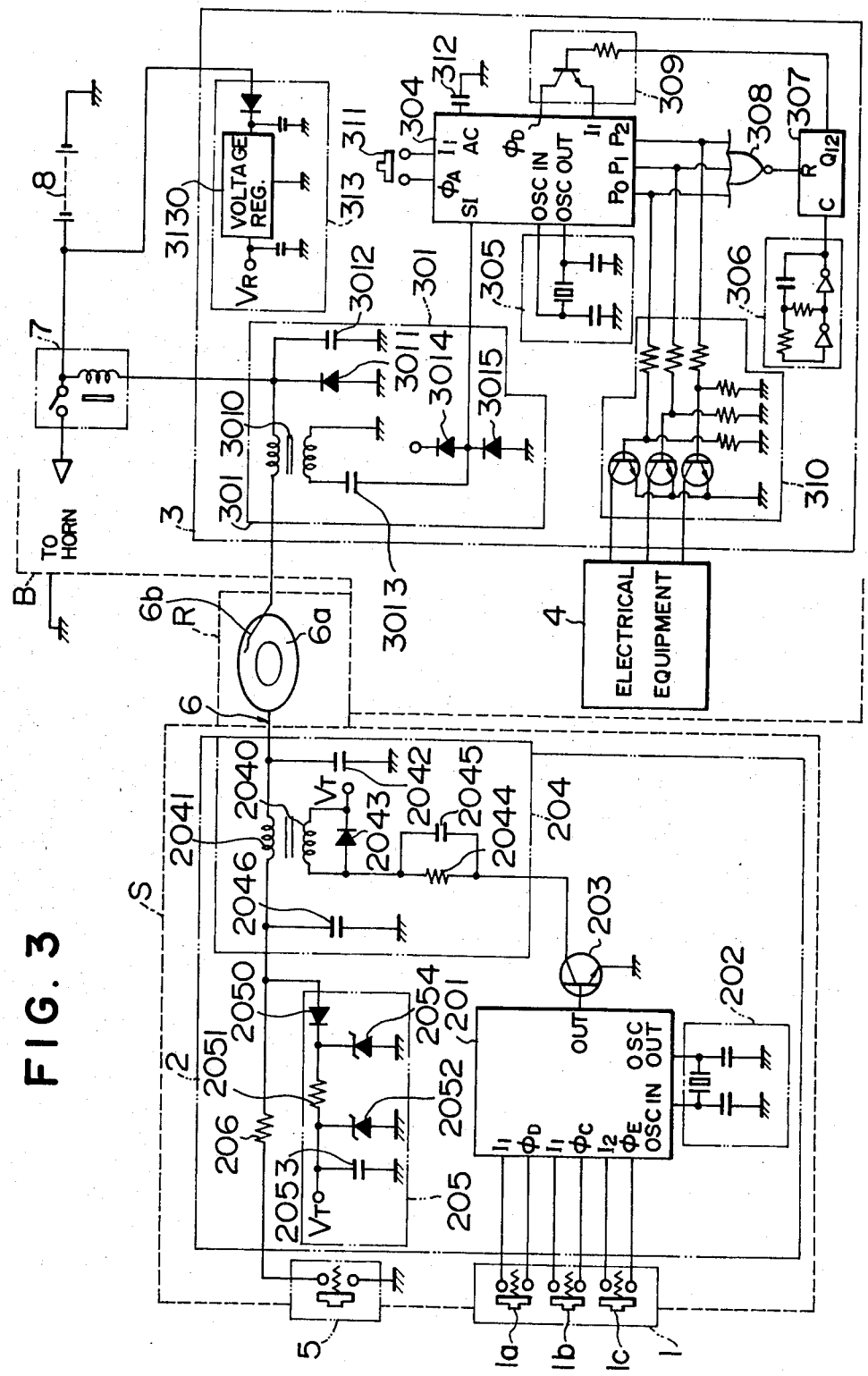

A third embodiment of the present invention is shown in FIG. 3. The third embodiment of the present invention, which is a modification of the first embodiment, differs basically from the first embodiment in the following points.

Firstly, the signal superposing circuit 204 includes a transmitter driver coil 2040, a signal transmitter coil 2041, an oscillation capacitor 2042, a surge absorbing diode 2043, a current limiting resistor 2044, a speed-up capacitor 2045 and a smoothing capacitor 2046. Therefore, the regulated voltage $V_T$ generated by the voltage regulator composed of the resistor 2051 and the Zener diode 2052 is supplied not only to the signal generating circuit 201 but also to the primary coil 2040 in the signal superposing circuit 204. Thus, even when the horn switch 5 is turned on temporarily, the charge stored in the capacitor 2053 in the voltage stabilizing circuit 205 is discharged to enable the signal transmitting unit 2 to perform its function. The frequency code signal is applied from a power supply terminal $V_T$ to the transmitter driver coil 2040 in response to the on-off of a transistor 203, and a frequency signal synchronous with the frequency code signal is induced in the signal transmitter coil 2041 by the electromagnetic induction. The current limiting resistor 2044 and the speed-up capacitor 2045 cooperate to minimize the electric power consumption of the signal superposing circuit 204.

Secondly, the frequency signal extracting circuit 301 in the signal receiving unit 3 shown in FIG. 3 has a structure similar to that of the frequency signal extracting circuit 301 shown in FIG. 2. Thus, the frequency signal induced in the secondary coil of the pulse transformer 3010 is capacitively coupled by a capacitor 3013 to the signal decoding circuit 304, and its peak value is limited by diodes 3014 and 3015 before the signal is applied to the signal decoding circuit 304.

In FIG. 3, the same reference numerals and symbols are used to designate the same or equivalent parts and symbols appearing in FIG. 1. The operation of the third embodiment shown in FIG. 3 is similar to that of the first embodiment shown in FIG. 1, and, therefore, any detailed description of its operation will be unnecessary. As described hereinbefore, even when the horn switch 5 is turned on temporarily to energize the horn relay 7, the charge stored in the capacitor 2053 in the voltage stabilizing circuit 205 in the signal transmitting unit 2 is discharged to energize the primary coil 2040 as soon as the switch 5 is turned off, so that a frequency signal can be induced in the secondary coil 2041 to enable the signal transmitting unit 2 to perform the function of signal transmission.

It will be understood from the foregoing detailed description of the first, second and third embodiments of the present invention that the DC signal path provided for electrically connecting the horn switch disposed on the steering wheel to the horn disposed on the vehicle body is utilized for transmitting a plurality of signal frequencies corresponding respectively to a plurality of additional electrical switches from a signal transmitting unit disposed in the steering wheel to a signal receiving unit disposed in the vehicle body, and this DC signal path is also utilized for supplying required power to the signal transmitting unit in the steering wheel. Therefore, the frequency signal can be reliably transmitted from the signal transmitting unit in the steering wheel to the signal receiving unit in the vehicle body without the necessity for providing additional electrical wirings in the vehicle.

We claim:

1. A switch apparatus for use in a vehicle comprising:
   a signal transmitting unit disposed in a steering wheel provided with an electrical switch;
   a signal receiving unit disposed in the body of the vehicle; and
   a current path disposed in a rotation transmission mechanism supported in said vehicle body for rotatably supporting said steering wheel, said current path supplying a DC signal from said electrical switch to said signal receiving unit;
   wherein said signal transmitting unit includes a plurality of additional electrical switches, signal generating means for generating a signal having a frequency indicative of information provided by manipulation of a selected one of said additional electrical switches, signal superposing means for superposing the signal frequency generated from said signal generating means on said DC signal supplied by way of said current path, and voltage regulating means for generating a regulated voltage related to said DC signal and supplying it to said signal generating means; and wherein said signal receiving unit includes signal extracting means for extracting said signal frequency supplied by way of said current path in the relation superposed on said DC signal, and signal decoding means for decoding said extracted signal frequency.

2. A switch apparatus according to claim 1, wherein said electrical switch is a horn switch, and said DC signal from said horn switch is transmitted to a horn by way of said current path and through said signal receiving unit.

3. A switch apparatus according to claim 1 or 2, wherein said signal extracting means includes inductance means connected to said current path.

4. A switch apparatus according to claim 3, wherein said signal superposing means includes inductance means connected to said current path.

5. A switch apparatus according to claim 4, wherein the regulated voltage generated from said voltage regulating means is supplied to said inductance means in said signal superposing means.

6. A switch apparatus according to claim 3, wherein said signal superposing means includes a switching element connected to said current path so as to make its switching operation in response to the signal frequency appearing from said signal generating means.

7. A switch apparatus according to claim 1, wherein said current path disposed in said rotation transmission mechanism includes a conductor ring and a brush engaging therewith.

8. A switch apparatus according to claim 1, wherein said additional electrical switches include control switches for controlling constant-speed running of the vehicle.

9. A switch apparatus for use in a vehicle comprising:
a signal transmitting unit disposed in a steering wheel provided with an electrical switch;
a signal receiving unit disposed in the body of the vehicle; and
a current path disposed in a rotation transmission mechanism supported in said vehicle body for rotatably supporting said steering wheel, said current path supplying a DC signal from said electrical switch to said signal receiving unit;
wherein said signal transmitting unit includes a plurality of additional electrical switches, signal generating means for generating a signal having a frequency indicative of information provided by manipulation of a selected one of said additional electrical switches, wherein said signal frequency generated in response to the manipulation of a selected one of said additional electrical switches appears consecutively from said signal generating means a plurality of times, signal superposing means for superposing the signal frequency generated from said signal generating means on said DC signal supplied by way of said current path, and voltage regulating means for generating a regulated voltage related to said DC signal and supplying it to said signal generating means; and wherein said signal receiving unit includes signal extracting means for extracting said signal frequency supplied by way of said current path in the relation superposed on said DC signal, and signal decoding means for decoding said extracted signal frequency.

10. A switch apparatus for use in a vehicle comprising:
a signal transmitting unit disposed in a steering wheel provided with a horn switch;
a signal receiving unit disposed in the body of the vehicle; and
a current path disposed in a rotation transmission mechanism supported in said vehicle body for rotatably supporting said steering wheel, said current path supplying a DC signal from said horn switch to said signal receiving unit which is further connected to a horn;
wherein said signal transmitting unit includes a plurality of additional electrical switches, signal generating means for generating a signal having a frequency indicative of information provided by manipulation of a selected one of said additional electrical switches, wherein said signal frequency generated in response to the manipulation of a selected one of said additional electrical switches appears consecutively from said signal generating means a plurality of times, signal superposing means for superposing the signal frequency generated from said signal generating means on said DC signal supplied by way of said current path, and voltage regulating means for generating a regulated voltage related to said DC signal and supplying it to said signal generating means; and wherein said signal receiving unit includes signal extracting means for extracting said signal frequency supplied by way of said current path in the relation superposed on said DC signal, and signal decoding means for decoding said extracted signal frequency.

* * * * *